(12) United States Patent
Jin et al.

(10) Patent No.: US 12,009,950 B2
(45) Date of Patent: Jun. 11, 2024

(54) DECISION FEEDBACK EQUALIZER CIRCUIT

(71) Applicants: Analogix (Suzhou) Semiconductor Co., LTD., Jiangsu (CN); ANALOGIX INTERNATIONAL LLC, Wilmington, DE (US)

(72) Inventors: Jiawei Jin, Beijing (CN); Fei Song, Beijing (CN)

(73) Assignees: ANALOGIX (SUZHOU) SEMICONDUCTOR Co., LTD., Jiangsu (CN); ANALOGIX INTERNATIONAL LLC

(*) Notice: Subject to any disclaimer, the term of this patent is extended or adjusted under 35 U.S.C. 154(b) by 4 days.

(21) Appl. No.: 17/283,027

(22) PCT Filed: Feb. 4, 2021

(86) PCT No.: PCT/CN2021/075308
§ 371 (c)(1),
(2) Date: Apr. 6, 2021

(87) PCT Pub. No.: WO2022/121106
PCT Pub. Date: Jun. 16, 2022

(65) Prior Publication Data
US 2023/0300008 A1  Sep. 21, 2023

(30) Foreign Application Priority Data
Dec. 11, 2020  (CN) .......................... 202011462832.7

(51) Int. Cl.
*H04L 25/03* (2006.01)
(52) U.S. Cl.
CPC .. *H04L 25/03057* (2013.01); *H04L 25/03006* (2013.01)

(58) Field of Classification Search
CPC ......... H04L 25/03057; H04L 25/03267; H04L 25/03146; H04L 25/030061;
(Continued)

(56) References Cited

U.S. PATENT DOCUMENTS

| 7,792,187 B2* | 9/2010 | Bulzacchelli ..... H04L 25/03057 375/232 |
| 8,477,833 B2* | 7/2013 | Bulzacchelli ..... H04L 25/03057 375/233 |
| 2015/0256362 A1 | 9/2015 | Ganzerli et al. |

FOREIGN PATENT DOCUMENTS

| CN | 203278880 U | 11/2013 |
| CN | 103491038 A | 1/2014 |

(Continued)

*Primary Examiner* — Betsy Deppe
(74) *Attorney, Agent, or Firm* — Samson G. Yu

(57) ABSTRACT

The present disclosure provides a decision feedback equalizer circuit. The decision feedback equalizer circuit includes: a first adder circuit, configured to add sampled data, first correction data and target correction data; a first sampler amplifier, configured to sample data output by the first adder circuit through a first signal component in a first clock signal to obtain a first sampling result; a second adder circuit, configured to add the sampled data, the first correction data and the target correction data; a second sampler amplifier, configured to sample data output by the second adder circuit through a second signal component in the first clock signal to obtain a second sampling result; and a correction parameter processing element, configured to determine the target correction data through a second clock signal, the first sampling result and the second sampling result.

10 Claims, 4 Drawing Sheets

(58) Field of Classification Search
CPC ... H04L 2025/0349; H04L 2025/03167; H04L 25/03006; H04L 2025/03617
See application file for complete search history.

(56) References Cited

FOREIGN PATENT DOCUMENTS

| | | |
|---|---|---|
| CN | 104618280 A | 5/2015 |
| CN | 107395127 A | 11/2017 |
| CN | 108616468 A | 10/2018 |

\* cited by examiner

US 12,009,950 B2

DECISION FEEDBACK EQUALIZER CIRCUIT

CROSS-REFERENCE TO RELATED APPLICATION

The present disclosure claims priority to Chinese Patent Application No. 202011462832.7, filed in the China National Intellectual Property Administration on Dec. 11, 2020 and entitled "Decision Feedback Equalizer Circuit", the entire contents of which are incorporated herein by reference.

TECHNICAL FIELD

The present disclosure relates to the technical field of decision feedback equalizers, and in particular to a decision feedback equalizer circuit.

BACKGROUND

In high-speed data transmission, due to the existence of non-ideal factors such as crosstalk and reflection, data is influenced by Inter-Symbol Interference (ISI) in a high-speed transmission process. Specifically, besides influence between adjacent data, influence of the ISI also includes influence between spaced data. In related art, a decision feedback equalizer with multiple tap paths (paths configured to correct influence of data that is transmitted first on data that is transmitted later in data that is transmitted at a high speed) is adopted to eliminate influence of ISI.

It is to be noted that a timing constraint of each tap path in the decision feedback equalizer with the multiple tap paths is crucial to eliminate influence of ISI. Specifically, in a half-rate decision feedback equalizer circuit, correction data is determined through potentials output by the multiple tap paths, thereby eliminating the ISI. However, for a tap2 path, due to a timing constraint of the tap2 path and influence of a load and capacitance connected with the tap2 path, the tap2 path is unlikely to be recovered to a stable potential during sampling of a Sampler Amplifiers (SA) in an odd channel and a SA in an even channel, bringing influence to an effect for eliminating the ISI.

For the problem in the related art that an output of the tap2 path in a decision feedback equalizer is unlikely to reach a stable value under a timing constraint and thus the effect for eliminating the ISI is poor, there is yet no effective solution at present.

SUMMARY

At least part of embodiments of the present disclosure provide a decision feedback equalizer circuit, so as to at least to partially solve the problem in the related art that an output of a tap2 path in a decision feedback equalizer is unlikely to reach a stable value under a timing constraint and thus an effect for eliminating the ISI is poor.

In an embodiment of the present disclosure, a decision feedback equalizer circuit is provided, which includes: a first adder circuit, configured to receive sampled data, first correction data and target correction data output by a correction parameter processing element and add the sampled data, the first correction data and the target correction data to obtain a first calculation result; a first SA, connected with the first adder circuit and configured to sample the first calculation result output by the first adder circuit through a first signal component in a first clock signal to obtain a first sampling result of a present sampling period; a second adder circuit, configured to receive the sampled data, the first correction data and the target correction data output by the correction parameter processing element and add the sampled data, the first correction data and the target correction data to obtain a second calculation result; a second SA, connected with the second adder circuit and configured to sample the second calculation result output by the second adder circuit through a second signal component in the first clock signal to obtain a second sampling result of the present sampling period, signal change directions of the second signal component and the first signal component being opposite; and the correction parameter processing element, connected with the first SA and the second SA respectively and configured to determine the first sampling result or the second sampling result as a target correction value through a second clock signal and determine the target correction data based on the target correction value, a time sequence of the second clock signal being prior to a time sequence of the first clock signal, such that components of the target correction data in the first sampling result obtained by sampling of the first SA and the second sampling result obtained by sampling of the second SA meet a preset requirement.

Optionally, the correction parameter processing element includes: a first Multiplexer (MUX), configured to select the first sampling result or the second sampling result through a level signal of the second clock signal and determine the selected sampling result as the target correction value; and a multiplier, connected with the first multiplexer and configured to calculate a product of the target correction value and a target correction coefficient to obtain the target correction data.

Optionally, the decision feedback equalizer circuit further includes an adaptation logic component, connected with the first SA and the second SA respectively and configured to receive the first sampling result and the second sampling result and determine the target correction coefficient through the first sampling result and the second sampling result.

Optionally, the decision feedback equalizer circuit further includes: a clock circuit, configured to send the second clock signal; and a first buffer, connected with the clock circuit and configured to delay the second clock signal to obtain the first clock signal.

Optionally, the decision feedback equalizer circuit further includes: the clock circuit, configured to send a clock signal; a second buffer, connected with the clock circuit and configured to delay the clock signal to obtain the second clock signal; and a third buffer, connected with the second buffer and configured to delay the second clock signal to obtain the first clock signal.

Optionally, the first SA is further configured to sample the first calculation result output by the first adder circuit through a rising edge signal in the first clock signal, and the second SA is further configured to sample the second calculation result output by the second adder circuit through a falling edge signal in the first clock signal; or, the first sampler amplifier is further configured to sample the first calculation result output by the first adder circuit through the falling edge signal in the first clock signal, and the second sampler amplifier is further configured to sample the second calculation result output by the second adder circuit through the rising edge signal in the first clock signal.

Optionally, the target correction data is configured to correct an interference of each piece of data in the sampled data to a next piece of spaced data.

Optionally, the first correction data is configured to correct an interference of each piece of data in the sampled data to a next piece of adjacent data, the first correction data includes first correction sub-data and second correction sub-data with the same absolute value, and the decision feedback equalizer circuit further includes: a second multiplexer, an input end of which connected with the first adder circuit, an output end of which connected with the first SA and configured to receive a third sampling result output by the second SA in a previous sampling period and determine first data or second data output by the first adder circuit as the first calculation result inputted into the first SA through the third sampling result, the first data being data obtained by adding, through the first adder circuit, the sampled data, the first correction sub-data and the target correction data and the second data being data obtained by adding, through the first adder circuit, the sampled data, the second correction sub-data and the target correction data; and a third multiplexer, an input end of which connected with the second adder circuit, an output end of which connected with the second SA at an output end and configured to receive a fourth sampling result output by the first SA in the previous sampling period and determine third data or fourth data output by the second adder circuit as the second calculation result inputted into the second SA through the fourth sampling result, the third data being data obtained by adding, through the second adder circuit, the sampled data, the first correction sub-data and the target correction data and the fourth data being data obtained by adding, through the second adder circuit, the sampled data, the second correction sub-data and the target correction data.

Optionally, the first correction data includes second correction data and third correction data, the second correction data is configured to correct the interference of each piece of data in the sampled data to the next piece of adjacent data, and the third correction data is configured to correct an interference of each piece of data in the sampled data to a piece of data spaced from this piece of data by N pieces of data, N being an integer greater than 1.

Through the embodiments of the present disclosure, the first adder circuit is configured to receive the sampled data, the first correction data and the target correction data output by the correction parameter processing element and add the sampled data, the first correction data and the target correction data to obtain the first calculation result; the first SA is connected with the first adder circuit and configured to sample the first calculation result output by the first adder circuit through the first signal component in the first clock signal to obtain the first sampling result of the present sampling period; the second adder circuit is configured to receive the sampled data, the first correction data and the target correction data output by the correction parameter processing element and add the sampled data, the first correction data and the target correction data to obtain the second calculation result; the second SA is connected with the second adder circuit and configured to sample the second calculation result output by the second adder circuit through the second signal component in the first clock signal to obtain the second sampling result of the present sampling period, the signal change directions of the second signal component and the first signal component being opposite; and the correction parameter processing element is connected with the first SA and the second SA respectively and configured to determine the first sampling result or the second sampling result as the target correction value through the second clock signal and determine the target correction data based on the target correction value, the time sequence of the second clock signal being prior to the time sequence of the first clock signal, such that the components of the target correction data in the first sampling result obtained by sampling of the first SA and the second sampling result obtained by sampling of the second SA meet the preset requirement. The problem in the related art that the output of the tap2 path in the decision feedback equalizer is unlikely to reach the stable value under the timing constraint and thus the effect for eliminating the ISI is poor is solved, and an effect of improving the SIS elimination accuracy is further achieved.

BRIEF DESCRIPTION OF THE DRAWINGS

The drawings forming part of the present disclosure are adopted to provide a further understanding to the present disclosure. Schematic embodiments of the present disclosure and descriptions thereof are adopted to explain the present disclosure and not intended to form improper limits to the present disclosure. In the drawings.

DETAILED DESCRIPTION

It is to be noted that the embodiments in the present disclosure and characteristics in the embodiments may be combined without conflicts. The present disclosure will be described below with reference to the drawings and in combination with the embodiments in detail.

In order to make those skilled in the art understand the solutions of the present disclosure better, the technical solutions in the embodiments of the present disclosure will be clearly and completely described below in combination with the drawings in the embodiments of the present disclosure. It is apparent that the described embodiments are not all embodiments but a part of the embodiments of the present disclosure. All other embodiments obtained by those of ordinary skill in the art on the basis of the embodiments in the present disclosure without creative work shall fall within the scope of protection of the present disclosure.

It is to be noted that terms "first", "second" and the like in the specification, claims and drawings of the present disclosure are adopted not to describe a specific sequence or order but to distinguish similar objects. It should be understood that data used like this can be exchanged where appropriate for conveniences for the embodiments of the present disclosure described here. In addition, terms "include" and "have" and any transformation thereof are intended to cover nonexclusive inclusions. For example, a process, method, system, product or device including a series of steps or elements is not limited to those clearly listed steps or elements, but may include other steps or elements which are not clearly listed or inherent in the process, the method, the system, the product or the device.

For convenient description, part of nouns or terms involved in the embodiments of the present disclosure will be described below.

Inter-symbol interference, the abbreviation of which is ISI, refers to a related interference between signals that are propagated at a high speed.

The abbreviation of Sampler amplifier is SA.

The abbreviation of multiplexer is MUX.

Adaptation logic component is configured to constantly sample control information in a running process of a system to determine a present practical working state of a controlled object, optimize a performance criterion and generate adaptive control logic, thereby regulating a structure or parameter of a controller in real time.

Figure 1:
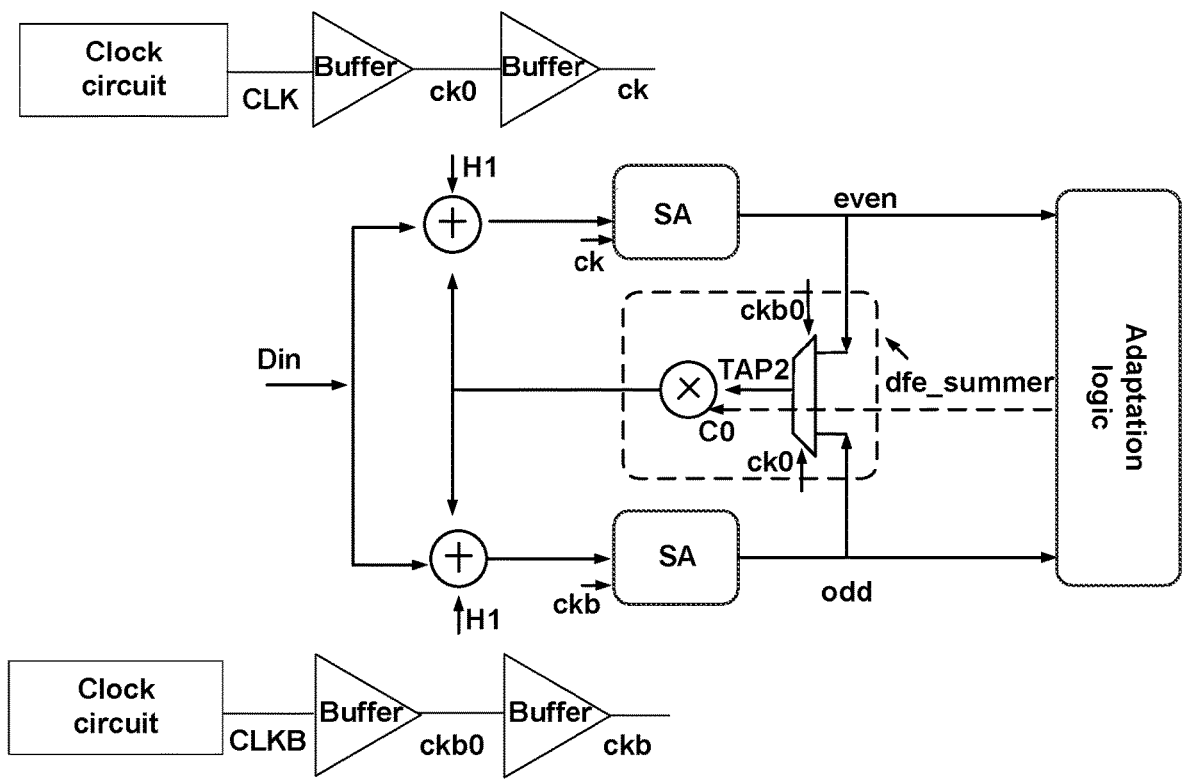
FIG. 1 is a schematic diagram of a decision feedback equalizer circuit according to an embodiment of the present disclosure.

According to some embodiments of the present disclosure, a decision feedback equalizer circuit is provided, FIG. 1 is a flowchart of a decision feedback equalizer circuit according to an embodiment of the present disclosure. As shown in FIG. 1, the decision feedback equalizer circuit includes a first adder circuit, a first SA, a second adder circuit, a second SA and a correction parameter processing element.

The first adder circuit is configured to receive sampled data, first correction data and target correction data output by the correction parameter processing element and add the sampled data, the first correction data and the target correction data to obtain a first calculation result.

The first SA is connected with the first adder circuit and configured to sample the first calculation result output by the first adder circuit through a first signal component in a first clock signal to obtain a first sampling result of a present sampling period.

The second adder circuit is configured to receive the sampled data, the first correction data and the target correction data output by the correction parameter processing element and add the sampled data, the first correction data and the target correction data to obtain a second calculation result.

The second SA is connected with the second adder circuit and configured to sample the second calculation result output by the second adder circuit through a second signal component in the first clock signal to obtain a second sampling result of the present sampling period, and signal change directions of the second signal component and the first signal component are opposite.

The correction parameter processing element is connected with the first SA and the second SA respectively and configured to determine the first sampling result or the second sampling result as a target correction value through a second clock signal and determine the target correction data based on the target correction value, a time sequence of the second clock signal being prior to a time sequence of the first clock signal, such that components of the target correction data in the first sampling result obtained by sampling of the first SA and the second sampling result obtained by sampling of the second SA meet a preset requirement.

In an optional embodiment of the present disclosure, the decision feedback equalizer circuit of is a half-rate decision feedback equalizer circuit. The first adder circuit and the first SA may be components in an even channel, and the second adder circuit and a second SA may be components in an odd channel. The first SA is configured to sample data of an even sequence in the sampled data Din through the first signal component ck of the first clock signal. The second SA is configured to sample data of an odd sequence in the sampled data Din through the second signal component ckb of the first clock signal.

Optionally, in the decision feedback equalizer circuit provided in the embodiment of the present disclosure, the first SA is further configured to sample the first calculation result output by the first adder circuit through a rising edge signal in the first clock signal, and the second SA is further configured to sample the second calculation result output by the second adder circuit through a falling edge signal in the first clock signal. Or, the first SA is further configured to sample the first calculation result output by the first adder circuit through the falling edge signal in the first clock signal, and the second SA is further configured to sample the second calculation result output by the second adder circuit through the rising edge signal in the first clock signal.

For example, under the condition that the first adder circuit and the first SA are components in the even channel and the second adder circuit and the second SA are components in the odd channel, the data of the even sequence is sampled through the rising edge signal of ck (the falling edge signal of ckb), and the data of the odd sequence is sampled through the falling edge signal of ck (the rising edge signal of ckb).

It is to be noted that, in a process of sampling data that is transmitted at a high speed, a sampling result of a next piece of data may be influenced by a previous piece of data and a sampling result of spaced data may also be influenced by the previous piece of data, for example, a sampling result spaced from the previous piece of data by at least one piece of data is influenced. That is, there are different types of ISI in a data sampling process. In the embodiment of the present disclosure, multiple tap paths may be adopted to eliminate the different types of ISI. A tap1 path is configured to correct an influence of each piece of data on data spaced from this piece of data by a Unit Interval (UI), a tap2 path is configured to correct an influence of each piece of data on data spaced from this piece of data by two UIs, and a tape path is configured to correct an influence of each piece of data on data spaced from this piece of data by n UIs. The UI refers to a sum of time lengths of a high-level signal and low-level signal of a sampling clock.

Specifically, the first adder circuit is arranged before the first SA to add the sampled data Din, the first correction data H1 and the target correction data to eliminate ISI of data sampled in the even channel. The second adder circuit is arranged before the second SA to add the sampled data Din, the first correction data H1 and the target correction data to eliminate ISI of data sampled in the odd channel.

Optionally, in the decision feedback equalizer circuit provided in the embodiment of the present disclosure, the target correction data is configured to correct an interference of each piece of data in the sampled data to a next piece of spaced data.

Optionally, in the decision feedback equalizer circuit provided in the embodiment of the present disclosure, the first correction data includes second correction data and third correction data, the second correction data is configured to correct an interference of each piece of data in the sampled data to a next piece of adjacent data, and the third correction data is configured to correct an interference of each piece of data in the sampled data to a piece of data spaced from this piece of data by N pieces of data, N being an integer greater than 1.

Through the embodiment of the present disclosure, different types of ISI of the previous piece of data to the next piece of adjacent data and the previous data to the sampling result of spaced data are eliminated.

It is to be noted that, in the embodiment of the present disclosure, after the data is sampled in the odd and even channels, the first correction data, a target correction coefficient and input data are superimposed to further eliminate the ISI. When the target correction data is adopted to correct the interference of each piece of data in the sampled data to the next piece of spaced data, and the target correction value is determined through the first clock signal, since the target correction value is an influence amplitude of each piece of data for the next piece of spaced data, under the condition of flipping the first clock signal from a high level to a low level, there is such a condition that the target correction value may not be recovered to a stable level during data sampling of the first SA and the second SA, and consequently, the target correction data obtained based on the target correction value is inaccurate and the interference of each piece of data in the sampled data to the next piece of spaced data cannot be eliminated accurately.

Figure 2:
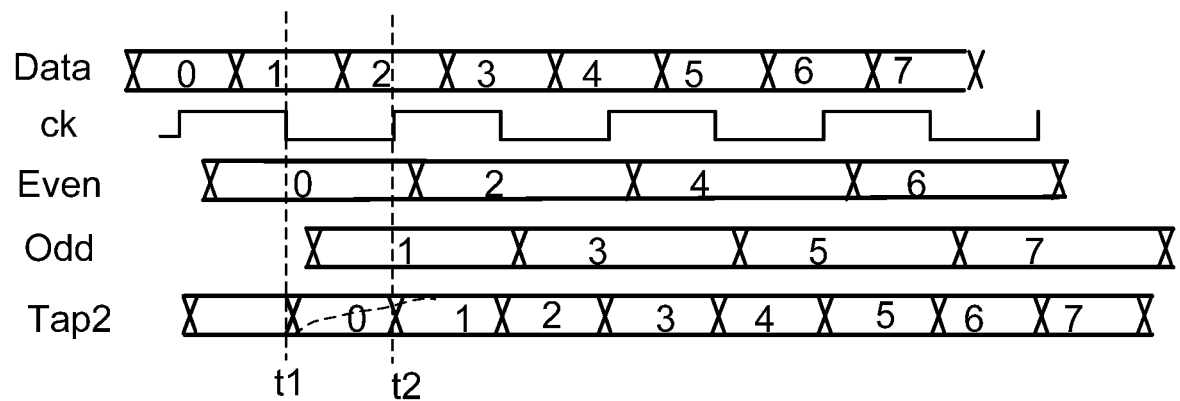
FIG. 2 is a first time sequence diagram of a decision feedback equalizer circuit according to an embodiment of the present disclosure.

For example, as shown in FIG. 2, for the tap2 path, when the tap2 path is required to recover data 1 at a time point t1 and data at last time point is data 0, a potential of the data 1 recovered by the tap2 path is determined by τ at a time point t2, τ being determined by a load and capacitance connected with the adder circuit by the tap2 path. When τ is smaller, the recovered potential of the tap2 path is more stable in a UI. However, in a high-speed data transmission process, due to a timing constraint of the tap2 path, a UI is usually likely to be optimized to be greater than 3T. Consequently, the tap2 path is unlikely to be recovered to a stable potential at the time point t2 and the ISI elimination effect is further influenced.

In the embodiment of the present disclosure, the correction parameter processing element determines the target correction value through the second clock signal. Since the time sequence of the second clock signal is prior to the time sequence of the first clock signal, the target correction value may be released in advance to keep the target correction value stable for more time, so that the target correction data obtained based on the target correction value is more accurate, and the interference of each piece of data in the sampled data to the next piece of spaced data is eliminated more accurately.

According to the decision feedback equalizer circuit provided in the embodiment of the present disclosure, the first adder circuit is configured to receive the sampled data, the first correction data and the target correction data output by the correction parameter processing element and add the sampled data, the first correction data and the target correction data to obtain the first calculation result. The first SA is connected with the first adder circuit and configured to sample the first calculation result output by the first adder circuit through the first signal component in the first clock signal to obtain the first sampling result of the present sampling period. The second adder circuit is configured to receive the sampled data, the first correction data and the target correction data output by the correction parameter processing element and add the sampled data, the first correction data and the target correction data to obtain the second calculation result. The second SA is connected with the second adder circuit and configured to sample the second calculation result output by the second adder circuit through the second signal component in the first clock signal to obtain the second sampling result of the present sampling period. The signal change directions of the second signal component and the first signal component are opposite. And the correction parameter processing element is connected with the first SA and the second SA respectively and configured to determine the first sampling result or the second sampling result as the target correction value through the second clock signal and determine the target correction data based on the target correction value, the time sequence of the second clock signal being prior to the time sequence of the first clock signal, such that the components of the target correction data in the first sampling result obtained by sampling of the first SA and the second sampling result obtained by sampling of the second SA meet the preset requirement. The problem in the related art that the output of the tap2 path in the decision feedback equalizer is unlikely to reach the stable value under the timing constraint and thus the effect for eliminating the ISI is poor is solved, and the effect of improving the ISI elimination accuracy is further achieved.

Optionally, in the decision feedback equalizer circuit provided in the embodiment of the present disclosure, the correction parameter processing element includes: a first multiplexer, configured to select the first sampling result or the second sampling result through a level signal of the second clock signal and determine the selected sampling result as the target correction value; and a multiplier, connected with the first multiplexer and configured to calculate a product of the target correction value and a target correction coefficient to obtain the target correction data.

Specifically, the correction parameter processing element is dfe_summer in FIG. 1. In the previous sampling period, the first SA samples data through the rising edge signal of ck to obtain the first sampling result even, and the second SA samples the data through the falling edge signal of ck to obtain the second sampling result odd. When the first multiplexer selects the first sampling result even as the target correction value (influence amplitude) through the low-level signal of ck and selects the second sampling result odd through a high level of ck to determine the target correction value, under the condition of level flipping of ck, there is such a condition that it is unlikely to obtain a relatively stable level for the target correction value before present data recovery ends.

Specifically, for example, at the moment of flipping ck from a high level to a low level, even enters dfe_summer, and a signal of which a slope changes slowly is obtained by differentiation, comparison and RC low-pass filtering. As shown in FIG. 2, the first sampling result even is 0 in a previous state and 1 in a present state and changes to a signal of which a slope increases slowly. The target correction data obtained based on the target correction value is added with the sampled data Din and the first correction data H1, and a sum of the target correction data, Din and H1 is input to the first SA and the second SA. Since the target correction value changes slowly and U1 is relatively short, when the first SA and the second SA sample the target correction value 1 at the time point t2, the target correction value may not be recovered to a relatively stable level 1, and a stable level 0.8 may be collected.

Figure 3:
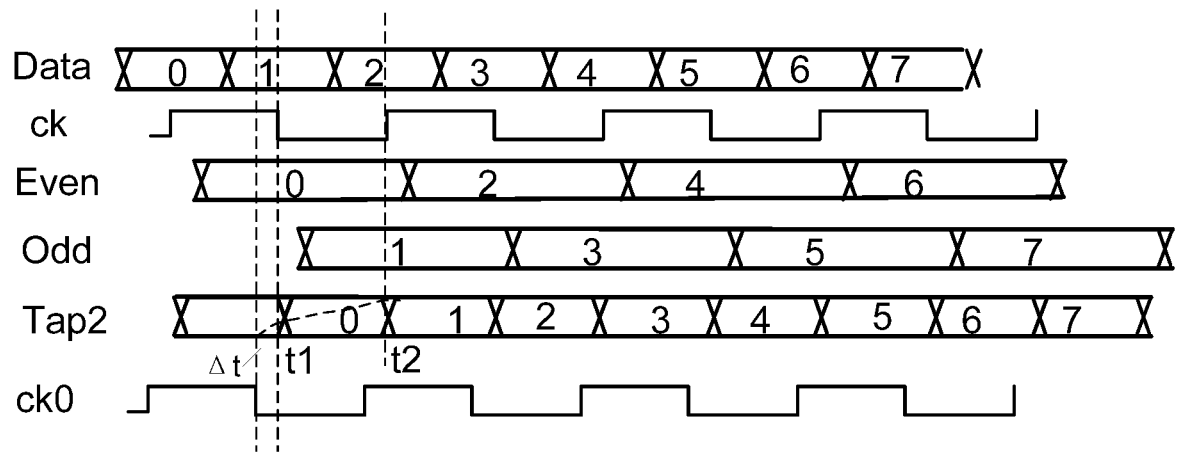
FIG. 3 is a second time sequence diagram of a decision feedback equalizer circuit according to an embodiment of the present disclosure.

In the embodiment of the present disclosure, the first multiplexer selects the second sampling result odd as the target correction value through a high-level signal of a first signal component ck0 of the second clock signal, and the second multiplexer selects the second sampling result odd as the target correction value through a low-level signal of the first signal component ck0 of the second clock signal (a high-level signal of a second signal component ckb0 of the second clock signal). Since a time sequence of ck0 is priori to a time sequence of ck, the target correction data is released in advance. Therefore, when the first SA or the second SA collects the target correction data fed back by the tap2 path through ck and then adds the target correction data, the first correction data H1 and the sampled data Din through the first adder circuit or the second adder circuit, the target correction value may be recovered to a stable potential. As shown in FIG. 3, the tap2 path recovers data by use of ck0 faster than ck by Δt, and time reserved for the tap2 path to stabilize the data changes to 1UI+Δt, so that a timing constraint of the tap2 path is optimized, and when the first SA and the second SA sample the data through ck, the obtained target correction data is more accurate.

Figure 4:
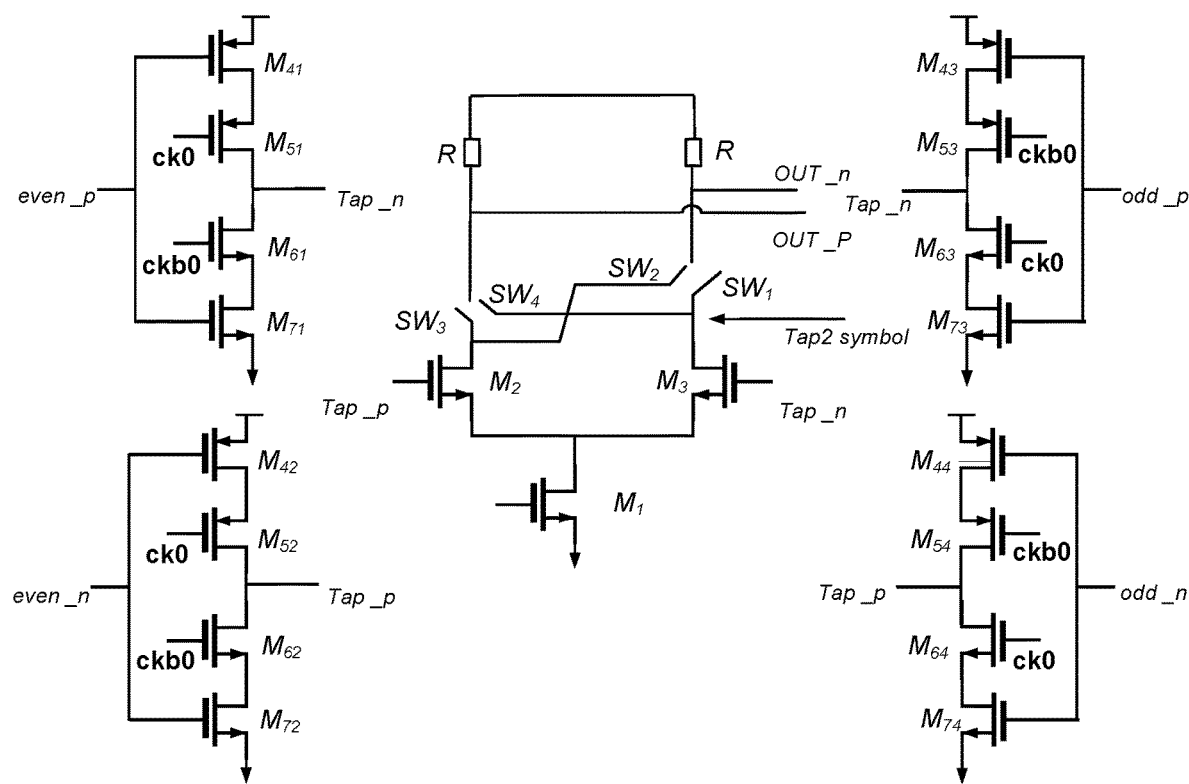
FIG. 4 is a circuit diagram of a correction parameter processing element in a decision feedback equalizer circuit according to an embodiment of the present disclosure.

Specifically, a specific circuit structure of the correction parameter processing element is shown in FIG. 4. A circuit formed by Metal-Oxide Semiconductor (MOS) transistors M41, M51, M61 and M71 and a circuit formed by MOS transistors M42, M52, M62 and M72 are configured to generate a differential signal of the first sampling result even, and a circuit formed by MOS transistors M43, M53, M63 and M73 and a circuit formed by MOS transistors M44, M54, M64 and M74 are configured to generate a differential signal of the second sampling result odd. That is, the circuits form a level triggered selector, and a function of selecting the first sampling result even or the second sampling result odd under the triggering of the high or low level of the second clock signal is realized.

MOS transistors M1, M2 and M3, single-pole double-throw switches SW1, SW2, SW3 and SW4 and a resistor R form a multiplier circuit. M1 is adjustable, so that a current of this path is configurable for regulating a value of the correction coefficient CO. Turning-on and turning-off of SW1, SW2, SW3 and SW4 determine a symbol of data output by the tap2 path. Specifically, a magnitude of a current value of M1 and turning-on and turning-off directions of SW1, SW2, SW3 and SW4 are controlled by logic of an adaptation logic component. The multiplier outputs the target correction data obtained by multiplying the correction coefficient CO with a symbol bit and the target correction value (the influence amplitude).

The target correction data is determined by the target correction value and the target correction coefficient. Optionally, in the decision feedback equalizer circuit provided in the embodiment of the present disclosure, the decision feedback equalizer circuit further includes an adaptation logic component, connected with the first SA and the second SA respectively and configured to receive the first sampling result and the second sampling result and determine the target correction coefficient through the first sampling result and the second sampling result.

It is to be noted that the adaptation logic component may determine a correction coefficient of each tap path. The correction coefficient includes a numerical value of the correction coefficient and also includes a plus sign or minus sign.

Specifically, as shown in FIG. 1, the adaptation logic component is adaptation logic, and the adaptation logic determines that the correction coefficient of the tap2 path is CO.

For ensuring that the time sequence of the second clock signal is prior to the time sequence of the first clock signal and waveforms of the first clock signal and the second clock signal are the same. Optionally, in the decision feedback equalizer circuit provided in the embodiment of the present disclosure, the decision feedback equalizer circuit further includes: a clock circuit, configured to send the second clock signal; and a first buffer, connected with the clock circuit and configured to delay the second clock signal to obtain the first clock signal.

Specifically, the clock circuit sends the second clock signal, the second clock signal consisting of the signal components ck0 and ckb0, and the first buffer delays the second clock signal, a delay time period being, for example, Δt, to obtain the first clock signal, the first clock signal consisting of the signal components ck and ckb.

The signal may also be delayed through multiple buffers. Optionally, in the decision feedback equalizer circuit provided in the embodiment of the present disclosure, the decision feedback equalizer circuit further includes: the clock circuit, configured to send a clock signal; a second buffer, connected with the clock circuit and configured to delay the clock signal to obtain the second clock signal; and a third buffer, connected with the second buffer and configured to delay the second clock signal to obtain the first clock signal.

Specifically, as shown in FIG. 1, the clock signal sent by the clock circuit is delayed through the second buffer to obtain the second clock signal, the second clock signal consisting of the signal components ck0 and ckb0, and the second clock signal is delayed through the third buffer, the delay time period being, for example, Δt, to obtain the first clock signal, the first clock signal consisting of the signal components ck and ckb.

It is to be noted that, when a time difference between the time sequences of the second clock signal and the first clock signal is too great, a timing requirement of the tap1 path may be influenced, and when the time difference is too small, the data output by the tap2 path is unlikely to be stabilized when the first SA and the second SA sample the data.

Therefore, in the embodiment of the present disclosure, the delay time period Δt is set appropriately under the condition of ensuring the time sequence of the tap1 path to ensure that the target correction value output by the tap2 path may reach a stable state when the first SA and the second SA sample the data.

Figure 5:
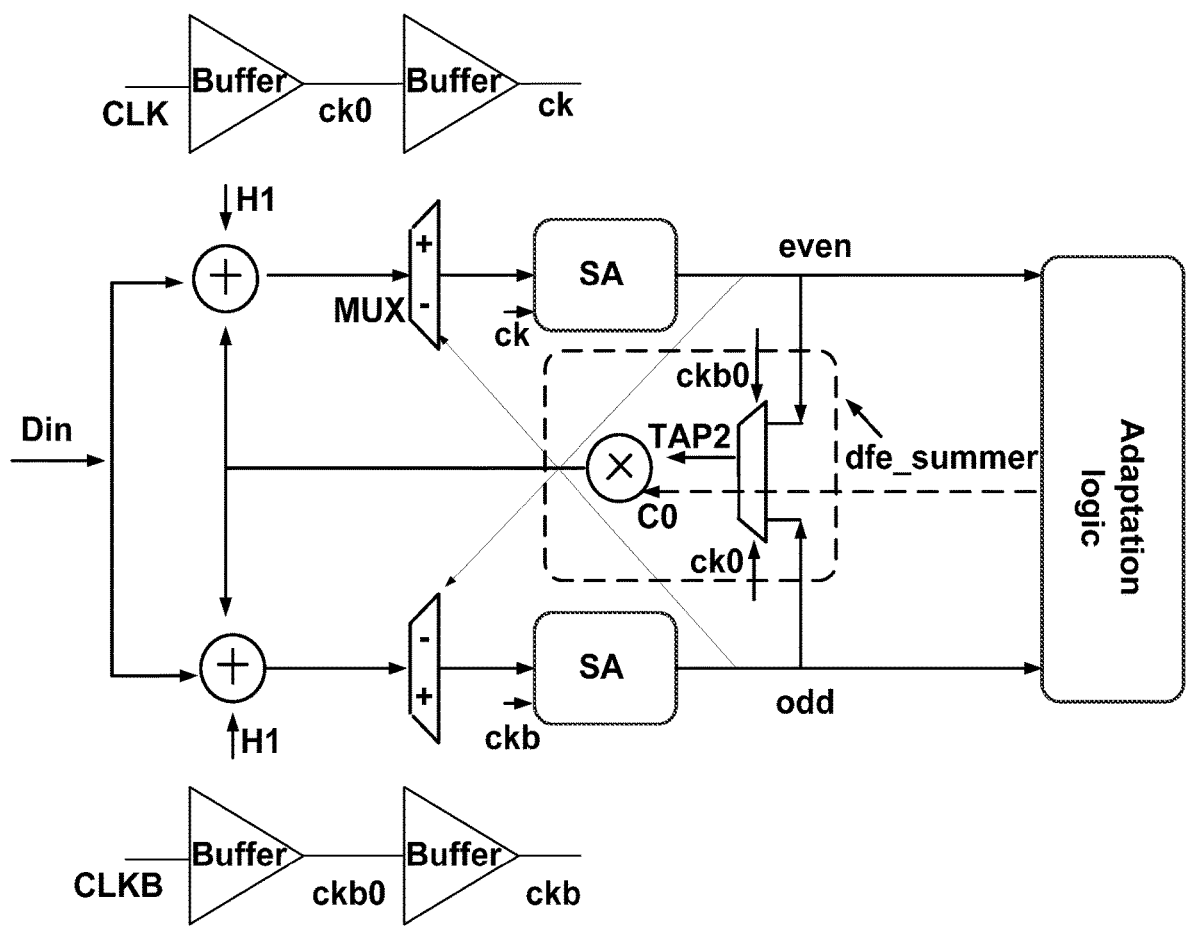
FIG. 5 is a schematic diagram of a decision feedback equalizer circuit according to an optional embodiment of the present disclosure.

Without considering the influence of each piece of data on a sampling result spaced from this piece of data by multiple pieces of data, optionally, in the decision feedback equalizer circuit provided in the embodiment of the present disclosure, the first correction data is configured to correct an interference of each piece of data in the sampled data to a next piece of adjacent data, the first correction data includes first correction sub-data and second correction sub-data. In FIG. 5, the decision feedback equalizer circuit further includes: a second multiplexer and a third multiplexer. An input end of the second multiplexer is connected with the first adder circuit, an output end of the second multiplexer is connected with the first SA and the second multiplexer is configured to receive a third sampling result output by the second SA in a previous sampling period and determine first data or second data output by the first adder circuit as the first calculation result of the first SA through the third sampling result. The first data is data obtained by adding, through the first adder circuit, the sampled data, the first correction sub-data and the target correction data. The second data is data obtained by adding, through the first adder circuit, the sampled data, the second correction sub-data and the target correction data. An input end of the third multiplexer is connected with the second adder circuit, an output end of the third multiplexer is connected with the second SA and the third multiplexer is configured to receive a fourth sampling result output by the first SA in the previous sampling period and determine third data or fourth data output by the second adder circuit as the second calculation result of the second SA through the fourth sampling result. The third data is data obtained by adding, through the second adder circuit, the sampled data, the first correction sub-data and the target correction data. The fourth data is data obtained by adding, through the second adder circuit, the sampled data, the second correction sub-data and the target correction data.

Specifically, as shown in FIG. 5, the first correction data is H1, wherein H1 includes the first correction sub-data+h1 and the second correction sub-data−h1. The first adder circuit and the first SA are components in the even channel. The first adder circuit adds the sampled data Din, the first correction sub-data+h1 and the target correction data (the product of CO and the target correction value output by the tap2 path) to obtain the first data and adds the sampled data Din, the second correction sub-data−h1 and the target correction data to obtain the second data. The first multiplexer determines whether to send the first data or the second data to the first SA or not according to whether the data sampled by the second SA in the previous sampling period is 0 or 1, thereby implementing sampling of the corrected data of the even channel.

The second adder circuit and the second SA are components in the odd channel. The second adder circuit adds the sampled data Din, the first correction sub-data+hl and the target correction data to obtain the third data and adds the sampled data Din, the second correction sub-data−h1 and the target correction data to obtain the fourth data. The second multiplexer determines whether to send the third data or the fourth data to the second SA or not according to whether the data sampled by the first SA in the previous sampling period is 0 or 1, thereby implementing sampling of the corrected data of the odd channel.

Through the embodiment of the present disclosure, the interference of a previous piece of data to a sampling result of a next piece of spaced data is eliminated, and the interference of the previous data to a sampling result of a next piece of adjacent data is also eliminated.

It is also to be noted that terms "include" and "contain" or any other transformations thereof are intended to cover nonexclusive inclusions such that a process, method, commodity or device including a series of elements not only includes those elements but also includes other elements that are not clearly listed or further includes elements intrinsic to the process, the method, the commodity or the device. Under the condition of no more limitations, an element limited by a statement "including a/an" does not exclude existence of another identical element in a process, method, commodity or device including the element.

The above are exemplary embodiments of the present disclosure and not intended to limit the present disclosure. For those skilled in the art, various modifications and variations may be made to the present disclosure. Any modifications, equivalent replacements, improvements and the like made within the spirit and principle of the present disclosure shall fall within the scope of the claims of the present disclosure.

INDUSTRIAL APPLICABILITY

The solution provided in the embodiments of the present disclosure may be applied to the technical field of decision feedback equalizers. In the embodiments of the present disclosure, the decision feedback equalizer circuit includes: the first adder circuit, configured to receive the sampled data, the first correction data and the target correction data output by the correction parameter processing element and add the sampled data, the first correction data and the target correction data to obtain the first calculation result; the first SA, connected with the first adder circuit and configured to sample the first calculation result output by the first adder circuit through the first signal component in the first clock signal to obtain the first sampling result of the present sampling period; the second adder circuit, configured to receive the sampled data, the first correction data and the target correction data output by the correction parameter processing element and add the sampled data, the first correction data and the target correction data to obtain the second calculation result; the second SA, connected with the second adder circuit and configured to sample the second calculation result output by the second adder circuit through the second signal component in the first clock signal to obtain the second sampling result of the present sampling period, the signal change directions of the second signal component and the first signal component being opposite; and the correction parameter processing element, connected with the first SA and the second SA respectively and configured to determine the first sampling result or the second sampling result as the target correction value through the second clock signal and determine the target correction data based on the target correction value, the time sequence of the second clock signal being prior to the time sequence of the first clock signal, such that the components of the target correction data in the first sampling result obtained by sampling of the first SA and the second sampling result obtained by sampling of the second SA meet the preset requirement. The problem in the related art that an output of a tap2 path in a decision feedback equalizer is unlikely to reach a stable value under a timing constraint and thus an effect for eliminating the ISI is poor is solved.

What is claimed is:

1. A decision feedback equalizer circuit, comprising:
   a first adder circuit configured to receive sampled data, first correction data and target correction data output by a correction parameter processing element and add the sampled data, the first correction data and the target correction data to obtain a first calculation result;
   a first sampler amplifier connected with the first adder circuit and configured to sample the first calculation result output by the first adder circuit according to a first signal component in a first clock signal to obtain a first sampling result of a present sampling period;
   a second adder circuit configured to receive the sampled data, the first correction data and the target correction data output by the correction parameter processing element and add the sampled data, the first correction data and the target correction data to obtain a second calculation result;
   a second sampler amplifier, connected with the second adder circuit and configured to sample the second calculation result output by the second adder circuit according to a second signal component in the first clock signal to obtain a second sampling result of the present sampling period, signal change directions of the second signal component and the first signal component being opposite; and
   the correction parameter processing element connected with the first sampler amplifier and the second sampler amplifier, respectively, and configured to determine the first sampling result or the second sampling result as a target correction value according to a second clock signal and determine the target correction data based on the target correction value, a time sequence of the second clock signal being prior to a time sequence of the first clock signal, such that components of the target correction data in the first sampling result obtained by sampling of the first sampler amplifier and the second sampling result obtained by sampling of the second sampler amplifier meet a preset requirement.

2. The decision feedback equalizer circuit as claimed in claim 1, wherein the correction parameter processing element comprises:
- a first multiplexer configured to select the first sampling result or the second sampling result according to a level signal of the second clock signal and determine the selected sampling result as the target correction value; and
- a multiplier connected with the first multiplexer and configured to calculate a product of the target correction value and a target correction coefficient to obtain the target correction data.

3. The decision feedback equalizer circuit as claimed in claim 2, further comprising:
- an adaptation logic component connected with the first sampler amplifier and the second sampler amplifier respectively and configured to receive the first sampling result and the second sampling result and determine the target correction coefficient according to the first sampling result and the second sampling result.

4. The decision feedback equalizer circuit as claimed in claim 1, further comprising:
- a clock circuit configured to send the second clock signal; and
- a first buffer connected with the clock circuit and configured to delay the second clock signal to obtain the first clock signal.

5. The decision feedback equalizer circuit as claimed in claim 4, further comprising:
- the clock circuit configured to send a clock signal;
- a second buffer connected with the clock circuit and configured to delay the clock signal to obtain the second clock signal; and
- a third buffer connected with the second buffer and configured to delay the second clock signal to obtain the first clock signal.

6. The decision feedback equalizer as claimed in claim 1, wherein the first sampler amplifier is configured to sample the first calculation result output by the first adder circuit according to a rising edge signal in the first clock signal, and the second sampler amplifier is further configured to sample the second calculation result output by the second adder circuit according to a falling edge signal in the first clock signal.

7. The decision feedback equalizer circuit as claimed in claim 1, wherein the target correction data is configured to correct an interference of each piece of data in the sampled data to a next piece of spaced data.

8. The decision feedback equalizer circuit as claimed in claim 1, wherein the first correction data is configured to correct an interference of each piece of data in the sampled data to a next piece of adjacent data, the first correction data comprises first correction sub-data and second correction sub-data with the same absolute value, and the decision feedback equalizer circuit further comprises:
- a second multiplexer having an input end which is connected with the first adder circuit and an output end which is connected with the first sampler amplifier and configured to receive a third sampling result output by the second sampler amplifier in a previous sampling period and determine first data or second data output by the first adder circuit as the first calculation result inputted into the first sampler amplifier according to the third sampling result, the first data being data obtained by adding, through the first adder circuit, the sampled data, the first correction sub-data and the target correction data and the second data being data obtained by adding, through the first adder circuit, the sampled data, the second correction sub-data and the target correction data; and
- a third multiplexer having an input end which is connected with the second adder circuit and an output end which is connected with the second sampler amplifier and configured to receive a fourth sampling result output by the first sampler amplifier in the previous sampling period and determine third data or fourth data output by the second adder circuit as the second calculation result inputted into the second sampler amplifier according to the fourth sampling result, the third data being data obtained by adding, through the second adder circuit, the sampled data, the first correction sub-data and the target correction data and the fourth data being data obtained by adding, through the second adder circuit, the sampled data, the second correction sub-data and the target correction data.

9. The decision feedback equalizer circuit as claimed in claim 1, wherein the first correction data comprises second correction data and third correction data, the second correction data is configured to correct an interference of each piece of data in the sampled data to a next piece of adjacent data, and the third correction data is configured to correct an interference of each piece of data in the sampled data to a piece of data spaced from this piece of data by N pieces of data, N being an integer greater than 1.

10. The decision feedback equalizer circuit as claimed in claim 1, wherein the first sampler amplifier is further configured to sample the first calculation result output by the first adder circuit according to the falling edge signal in the first clock signal, and the second sampler amplifier is further configured to sample the second calculation result output by the second adder circuit according to the rising edge signal in the first clock signal.

* * * * *